US008032567B2

(12) United States Patent
Schemer et al.

(10) Patent No.: US 8,032,567 B2
(45) Date of Patent: *Oct. 4, 2011

(54) DEMONSTRATION TOOL FOR A BUSINESS INFORMATION ENTERPRISE SYSTEM

(75) Inventors: Eric Schemer, Heidelberg (DE); Tanja B. Wingerter, Heidelberg (DE); Markus Ulke, Heidelberg (DE)

(73) Assignee: SAP AG, Walldorf (DE)

( * ) Notice: Subject to any disclaimer, the term of this patent is extended or adjusted under 35 U.S.C. 154(b) by 0 days.

This patent is subject to a terminal disclaimer.

(21) Appl. No.: 12/914,723

(22) Filed: Oct. 28, 2010

(65) Prior Publication Data

US 2011/0041048 A1 Feb. 17, 2011

Related U.S. Application Data

(63) Continuation of application No. 11/144,506, filed on Jun. 3, 2005, now Pat. No. 7,836,104.

(51) Int. Cl.
*G06F 17/30* (2006.01)
*G06F 15/16* (2006.01)

(52) U.S. Cl. ........ 707/811; 715/212; 715/217; 715/227; 715/234

(58) Field of Classification Search ............... 707/777, 707/778, 956, 601, 811; 706/934; 715/212, 715/227, 234, 243
See application file for complete search history.

(56) References Cited

U.S. PATENT DOCUMENTS

| | | | |
|---|---|---|---|
| 5,978,811 A * | 11/1999 | Smiley | 1/1 |
| 6,807,549 B2 * | 10/2004 | Miron | 1/1 |
| 6,816,865 B2 * | 11/2004 | O'Brien et al. | 1/1 |
| 6,920,458 B1 | 7/2005 | Chu et al. | |
| 7,143,339 B2 * | 11/2006 | Weinberg et al. | 715/212 |
| 7,299,406 B2 * | 11/2007 | Schnurr | 715/212 |
| 2003/0140028 A1 * | 7/2003 | Sjogren et al. | 707/1 |
| 2003/0140117 A1 * | 7/2003 | Kunz | 709/218 |
| 2003/0174179 A1 * | 9/2003 | Suermondt et al. | 345/853 |
| 2004/0061715 A1 * | 4/2004 | Chu et al. | 345/709 |
| 2004/0172591 A1 * | 9/2004 | Rothschiller et al. | 715/503 |
| 2004/0181543 A1 * | 9/2004 | Wu et al. | 707/102 |
| 2004/0205535 A1 * | 10/2004 | Newman et al. | 715/509 |
| 2004/0205536 A1 * | 10/2004 | Newman et al. | 715/509 |
| 2005/0060647 A1 * | 3/2005 | Doan et al. | 715/514 |
| 2005/0114369 A1 * | 5/2005 | Gould et al. | 707/100 |
| 2005/0172217 A1 * | 8/2005 | Leung | 715/503 |
| 2005/0210389 A1 * | 9/2005 | Middelfart | 715/730 |
| 2005/0216497 A1 * | 9/2005 | Kruse et al. | 707/101 |
| 2005/0223051 A1 * | 10/2005 | Arakaki | 708/490 |
| 2006/0101324 A1 * | 5/2006 | Goldberg et al. | 715/503 |
| 2006/0107204 A1 * | 5/2006 | Epstein | 715/517 |
| 2006/0173906 A1 * | 8/2006 | Chu et al. | 707/102 |

* cited by examiner

*Primary Examiner* — Jacob F Betit
*Assistant Examiner* — Dennis Truong
(74) *Attorney, Agent, or Firm* — Buckley, Maschoff & Talwalkar LLC (57) ABSTRACT

According to some embodiments, demonstration data is received via a front-end application associated with a business information enterprise system. The demonstration data may then be interpreted in accordance with at least one rule to generate business data. A query may be received at a back-end application associated with the business information enterprise system. At least a portion of the business data may then be presented in accordance with the received query.

22 Claims, 11 Drawing Sheets

CHARACTERISTICS:

| INFO OBJECT | DESCRIPTION | NAVIGATION? | HIERARCHY? |
|---|---|---|---|
| COUNTRY | COUNTRY | YES | NO |
| DIV | DIVISION | NO | NO |
| SALE_E | SALES EMPLOYEE | NO | NO |
| MAT | MATERIAL | YES | YES |

KEY FIGURES:

| INFO OBJECT | DESCRIPTION | UNIT | AGGREGATION |
|---|---|---|---|
| COST | COST | DOLLARS | SUM |
| INV_QUAN | INVENTORY QUANTITY | ITEMS | SUM |

FIG. 5

| COMPANY | REVENUE | EMPLOYEES | PROFIT |
|---|---|---|---|
| GLOBAL INC. | 5,000,000 | 60 | 200,000 |
| TECH LLC | 4,000,000 | 50 | 600,000 |
| ABC CO. | 10,000,000 | 120 | 350,000 |
| NATIONAL INC. | 5,000,000 | 40 | 500,000 |
| XYZ INC. | 2,000,000 | 8 | 0 |

DEMONSTRATION DATA (CELLS IN A SPREADSHEET)

| PRODUCTS | | | |
|---|---|---|---|
| | MONITORS | | |
| | | CRT | |
| | | LCD | |
| | PRINTERS | | |
| | | LASER | |
| | | INKJET | |

DEMONSTRATION DATA (CELLS IN A SPREADSHEET)

DEMONSTRATION TOOL FOR A BUSINESS INFORMATION ENTERPRISE SYSTEM

CROSS-REFERENCE TO RELATED APPLICATION

This is a continuation of co-pending prior U.S. patent application Ser. No. 11/144,506 entitled "Demonstration Tool For a Business Information Enterprise System", which application is incorporated herein by reference.

FIELD

Some embodiments of the present invention relate to business information enterprise systems. In particular, some embodiments are associated with using demonstration data in connection with a business information enterprise systems.

BACKGROUND

A business information enterprise system can improve an organization's ability to monitor and manage data in a complex business environment. For example, the system might store a large amount of information, such as yearly global sales figures on both a company-wide and regional basis. Different users may then access the information in different ways. For example, a first user might be interested in a normalized comparison of each year's sales figures as compared to other years. Another user might instead want to compare historical sales figures on a region-by-region basis. Note that many different types of data could be stored by, and accessed from, a business information enterprise system (e.g., inventory data, employee data, and/or accounting data), and that different types of data will be used by different organizations.

Before selecting a particular business information enterprise system for an organization, a user might want to see a demonstration of how data can be accessed in different ways (e.g., to determine if the system is the most appropriate choice for the organization). To facilitate such a demonstration, a pre-defined set of fictional business data could be stored by, and accessed from, the business information enterprise system (e.g., monthly sales figures for "Company ABC, Inc."). With such an approach, however, it can be difficult for a user to evaluate the system as it relates to his or her specific organization (e.g., because the types of fictional data being used do not reflect the types of data that will be used by the organization).

Approaches that may improve a user's ability to evaluate a business information enterprise system may therefore be desirable. Moreover, it may advantageous to provide a tool that facilitates demonstrations in a relatively timely and cost efficient manner.

BRIEF DESCRIPTION OF THE DRAWINGS

FIG: 8 illustrates an example of hierarchy information according to some embodiments.

DETAILED DESCRIPTION

Figure 1:
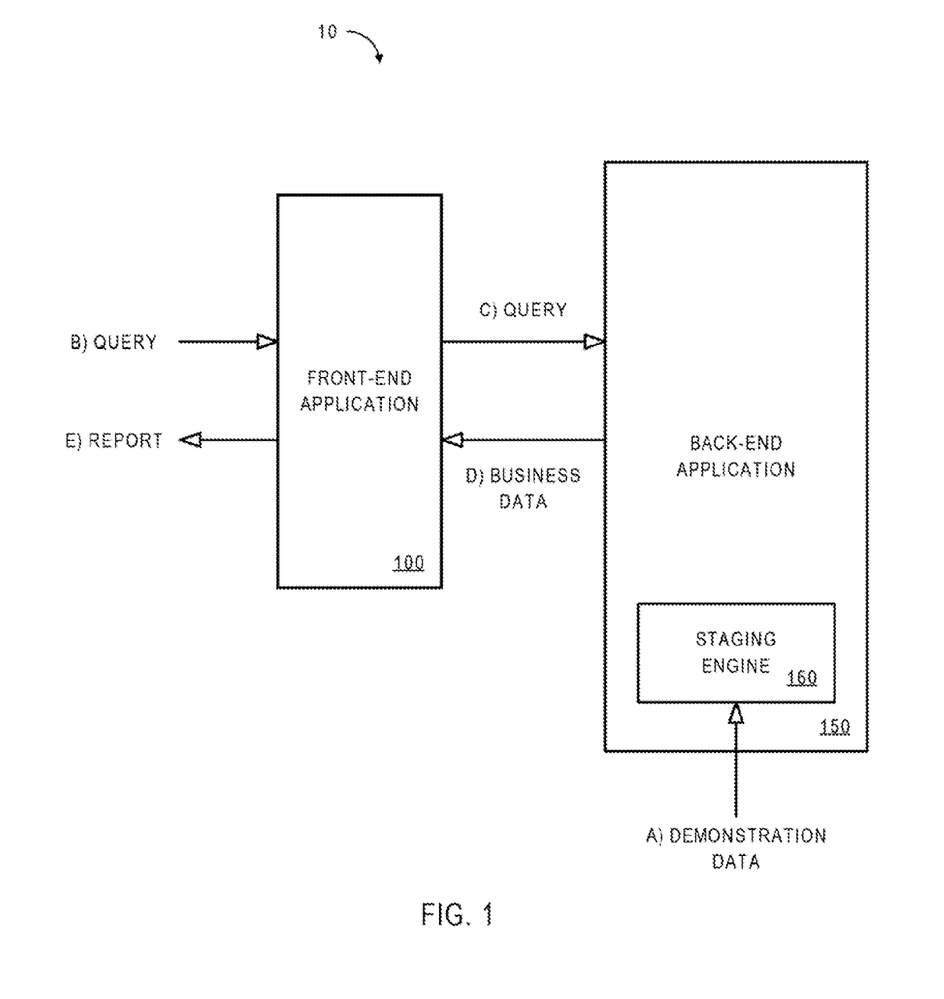
FIG. 1 is an information flow diagram illustrating the use of demonstration data in connection with a business information enterprise system.

To alleviate problems inherent in the prior art, some embodiments of the present invention introduce systems, methods, computer program code and means to facilitate an evaluation of a business information enterprise system using demonstration data. FIG. 1 is an information flow diagram illustrating the use of demonstration data in connection with a business information enterprise system 10.

The system 10 includes a back-end application 150. The back-end application 150 might be designed, for example, to store and process a substantial amount of business information associated with an enterprise.

The back-end application 150 may include a staging engine 160 adapted to receive actual business information from various sources. For example, the staging engine 160 might generate and execute transformation programs to import data from a number of different third-party applications (e.g., by extracting the data and converting the data to a common format). The staging engine 160 might also monitor scheduling and data load processes as an actual enterprise generates business information.

The system 10 also includes a front-end application 100 that may be accessed by a user. Note that the front-end application 100 may be remote from the back-end application 150 (e.g., and the two applications 100, 150 may communication via a communication network such as the Internet).

The front-end application 100 might be, for example, a spreadsheet application such as the MICROSOFT® EXCEL® spreadsheet program. A user may access the front-end application 100 to request particular information, in a particular format, from the back-end application 150. For example, the user might generate a request or "query" asking for weekly inventory information from a number of different regions over the last year. After the data is retrieved by the back-end application 150, it may be formatted as a report and displayed to the user via the front-end application 100.

A user associated with an organization (which is not currently using the system 10) may be interested in evaluating the system 10. To demonstrate how the business information enterprise system 10 will operate for that particular organization, at (A) "demonstration" data is loaded into to the staging engine 160. The demonstration data may be, for example, actual business information that has been generated by the organization. Typically, the demonstration data is stored on a storage medium (e.g., a magnetic tape) and the storage medium is physically delivered to the location of the back-end system 150. The staging engine 160 is then used to load the demonstration data into the back-end system 150.

At (B) the user generates a query using the front-end application 100 (e.g., asking to receive a particular set of business data), which is forwarded to the back-end application 150 at (C). The back-end application 150 retrieves the appropriate business information from the demonstration data and transmits it to front-end application 100 at (D) so that a report can be provided to the user at (E).

Loading the demonstration data into the staging engine 160, however, can be a time consuming and relatively costly process. For example, it might take several days to load the demonstration data into the back-end application in this way. Moreover, after a user begins to evaluate the system 10 he or she might decide that a different set of demonstration data would be more helpful (and would then need to wait several more days as the new data is loaded into the back-end application 150).

Figure 2:
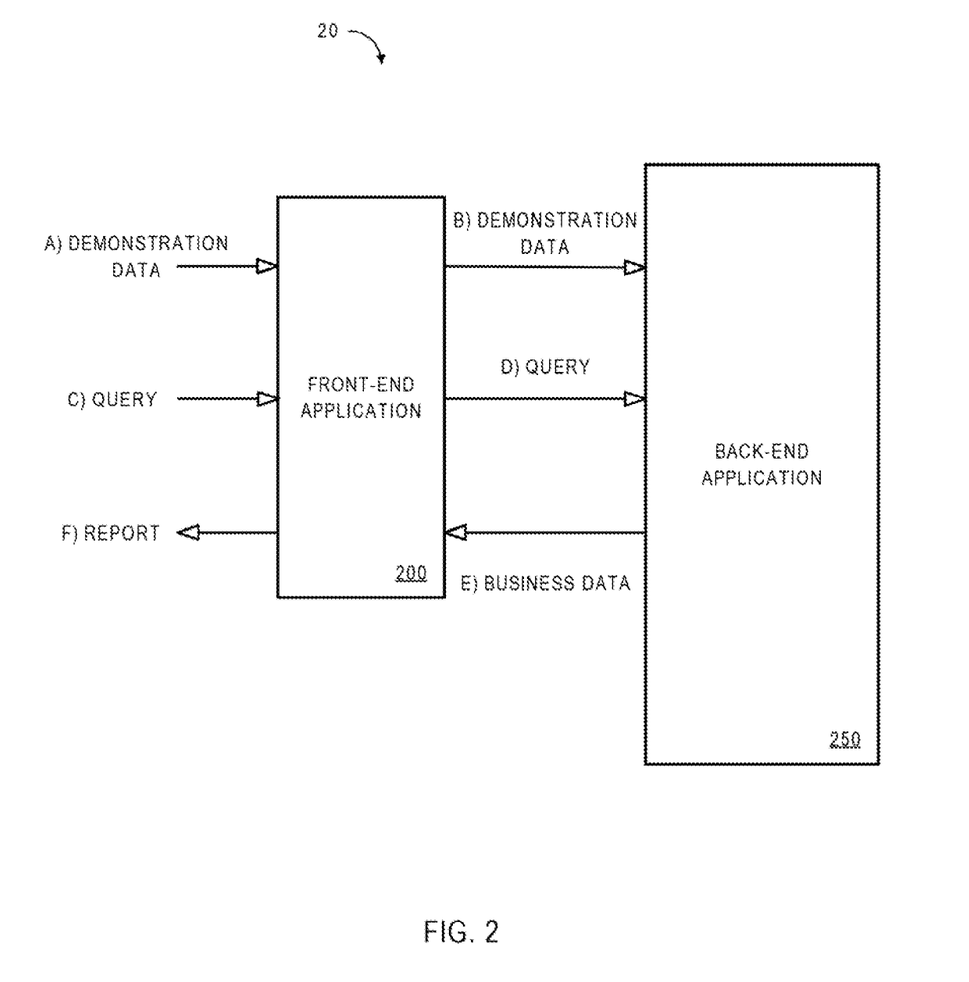
FIG. 2 is an information flow diagram illustrating the use of demonstration data according to some embodiments.

FIG. 2 is an information flow diagram illustrating the use of demonstration data according to some embodiments of the present invention. As before, the business information enterprise system 20 includes a back-end application 250 designed to store and process a substantial amount of business information associated with an enterprise. The system 20 also includes a front-end application 200 (e.g., remote from the back-end application 250) that can be used to access business data.

At (A), demonstration data is entered using the front-end application 200. For example, the demonstration data might be entered into the cells of a spreadsheet application. The demonstration data is then transmitted from the front-end application 200 to the back-end application 250 at (B).

At (C), a user generates a query using the front-end application 200 (e.g., asking to receive a particular set of business data), which is forwarded to the back-end application 250 at (D). The back-end application 250 retrieves the appropriate information from the demonstration data and transmits it to front-end application 200 at (E) so that a report can be provided to the user at (F). Because the demonstration data does not need to be loaded through a staging engine, such an approach may be more flexible and efficient as compared to the one described with respect to FIG. 1.

Figure 3:
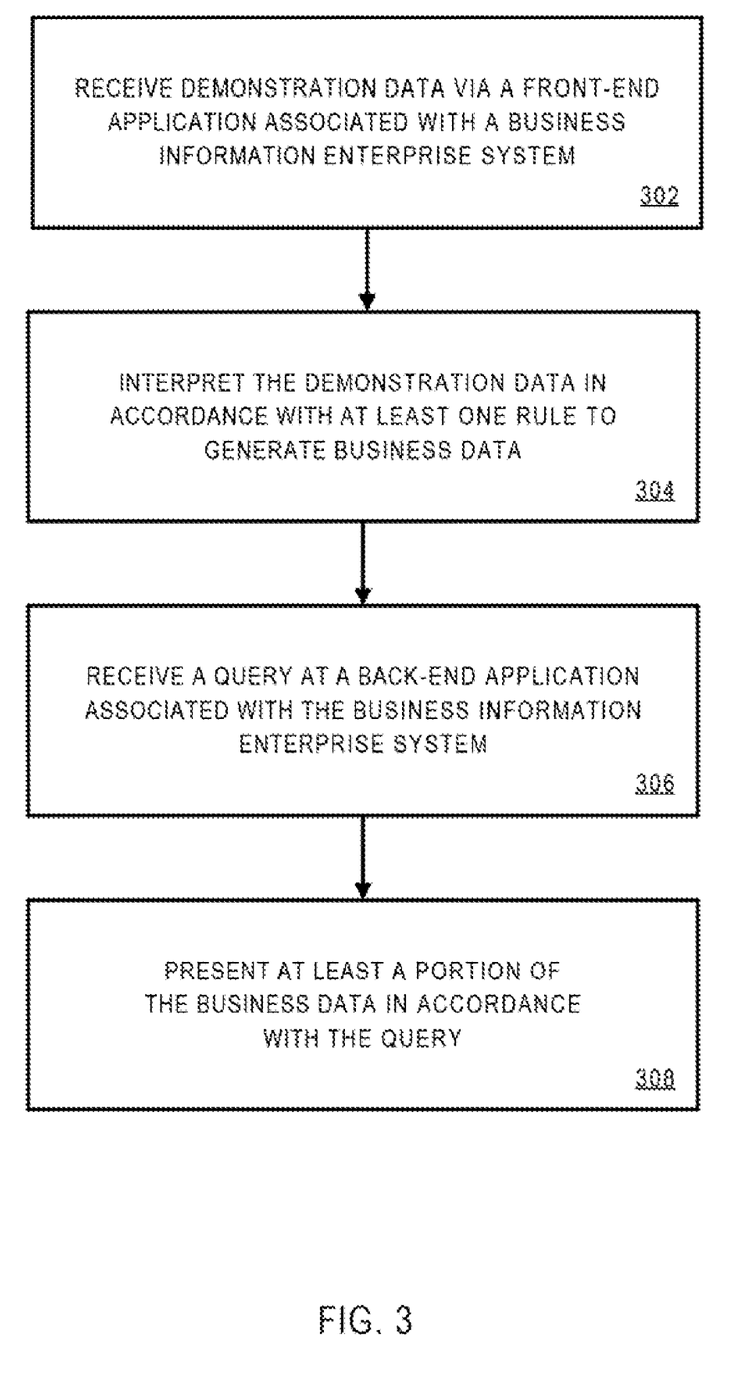
FIG. 3 is a flow diagram of process steps pursuant to some embodiments.

FIG. 3 is a flow diagram of process steps pursuant to some embodiments. The flow charts described herein do not necessarily imply a fixed order to the actions, and embodiments may be performed in any order that is practicable. Note that any of the methods described herein may be performed by hardware, software (including microcode), firmware, or any combination of these approaches. For example, a storage medium may store thereon instructions that when executed by a machine result in performance according to any of the embodiments described herein.

At 302, demonstration data is received via a front-end application associated with a business information enterprise system. For example, the front-end application might be spreadsheet program, in which case the demonstration data may be entered into spreadsheet cells. The demonstration data might be, for example, actual business data associated with an organization interested in evaluating a business information enterprise system.

The demonstration data is interpreted at 304 in accordance with at least one rule to generate business data. For example, a back-end application might receive the demonstration data and interpret the data in order to generate an information object in accordance with the system's data architecture. Some examples of rules that might be used to interpret the demonstration data are provided with respect to FIGS. 5 through 11. According to another embodiment, some or all of the interpretation of the demonstration data may be performed by an application other than the back-end application (e.g., the front-end application might perform some or all of this function).

At 306, a query is received at a back-end application associated with the business information enterprise system. The query might comprise, for example, a specification of a certain dynamic view of multi-dimensional business data. In some cases, a query may allow for multi-dimensional navigation of the information. Note that query might instead be associated with "flat" information. According to some embodiments, the demonstration data (e.g., from a spreadsheet) is used to generate or update an Operational Data Source (ODS) object. Moreover, an information set is generated on the ODS object, and a query can then be defined based on the information set.

At least a portion of the business data may then be presented at 308 in accordance with the query. For example, the appropriate business data might be provided to a user as a report including text, graphical, and/or interactive elements.

Figure 4:
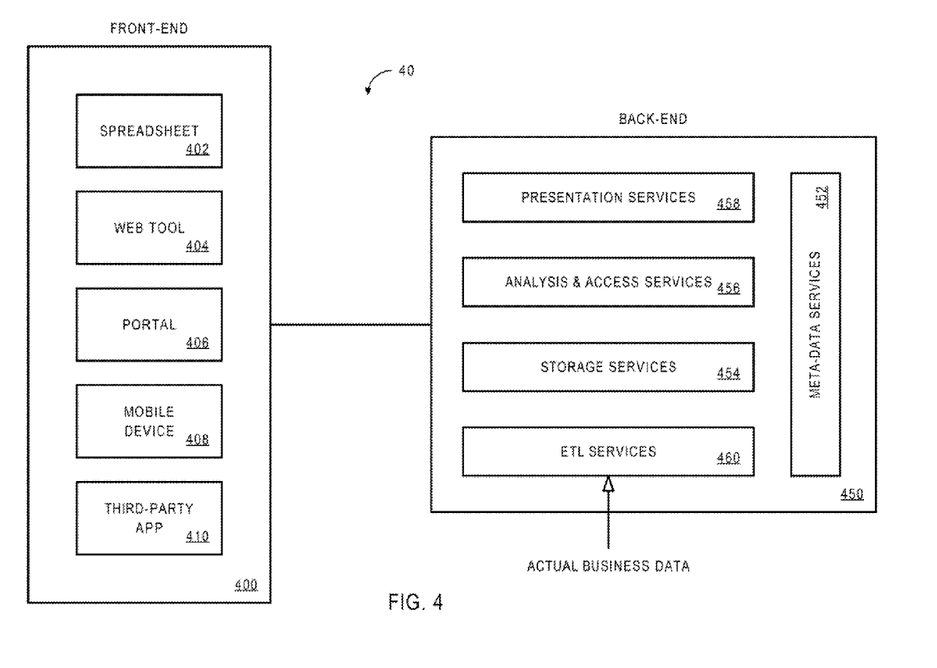
FIG. 4 is a block diagram of a business information enterprise system according to one embodiment.

FIG. 4 is a block diagram of a business information enterprise system 40 including a front-end 400 and a back-end 450. The front end 400 may be used to provide demonstration data to the system 40 and to receive business data from the system 40 (e.g., a sample report may be provided to a user who is evaluating the system). As before, the front-end 400 might be associated with a spreadsheet application 402. The front-end 400 might also be associated with a Web tool 404 (e.g., a Web authoring tool or browser), a portal 406, a mobile device 408, or a third-party application 410.

The system 40 also includes a back-end 450 which may store and process business information. The back-end 450 might include, for example, one or more Extraction, Transformation, and Loading (ETL) services 460 to import actual business data into the system 40 (e.g., business data associated with an organization that actually using the system 40 as opposed to merely evaluating the system 40). The ETL services 460 might perform, for example, data extraction, data transformation, and data loading (e.g., via a staging engine).

The back-end 450 might also include one or more storage services 454 that store and archive business information. For example, the storage services 454 might provide access to different data targets available in the system 40, archive dormant data, and/or manage relational or multi-dimensional databases.

One or more analysis and access services 456 might also be provided in the back-end 450. Such a service 456 might, for example, facilitate an analysis of structured and/or unstructured information stored in the system 40 and may include a data mining engine.

In addition, the back-end 450 may include one or more presentation services 458 to provide different ways of presenting information to an end user. According to some embodiments, the presentation service 458 might include a query design engine, a formatting engine, and/or an Extensible Mark-up Language (XML) interface (e.g., to provide data via a Web portal).

According to some embodiments, one or more "meta-data" services 452 are also provided at the back-end 450. As used herein, the term "meta-data" may refer to, for example, information about business data that is distributed across a landscape of a system's architectural components (e.g., describing what data resides where). The meta-data service 542 might, for example, store meta-data and handle requests to retrieve, add, change, or delete the meta-data.

One type of meta-data that might be associated with the system 40 is an "information object." As used herein, the phrase "information object" might refer to, for example, a low-level business object that describe business processes and/or information requirements.

An example of an information object is a "key figure" that describes any kind of numeric information from the business process level, such as sales quantities or revenues. A key figure might be associated with an amount, a quantity, a number, an integer, a date, and/or a time value. A specific key figure might include a technical description of the key figure (e.g., a data type) and a business description (e.g., a unit of measure, currency, aggregation behavior, and/or display properties).

Another example of an information object is a "characteristic," which may describe the objects dealt with in a business process. Examples of characteristics include customers, products, colors, addresses, and status information (e.g., indicating whether an order is "pending" or "filled").

Figure 5:
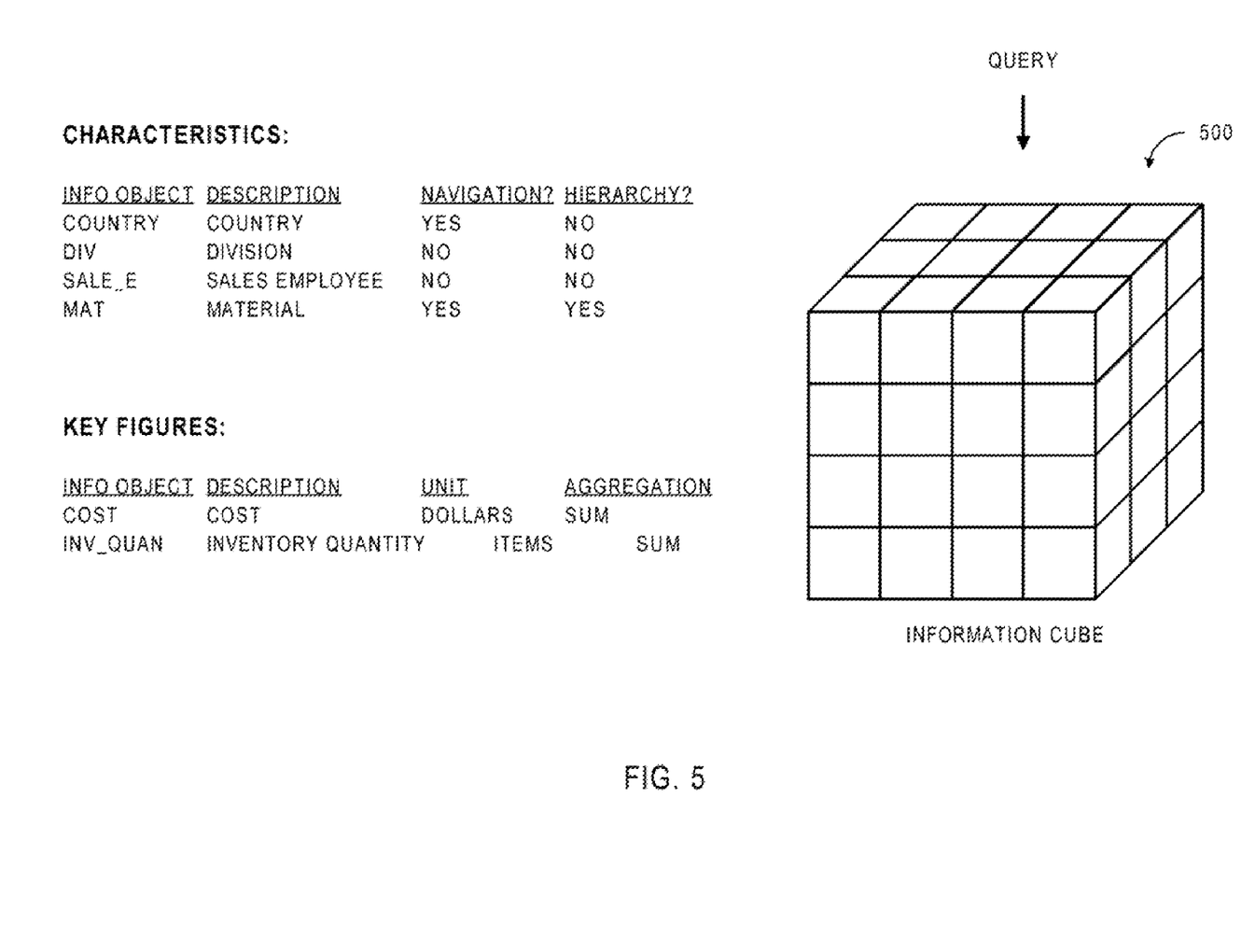
FIG. 5 illustrates an example of characteristics, key figures, and an information cube according to some embodiments.

Taken together, characteristics and key figures may comprise an "information cube." As used herein, the phrase "information cube" may refer to a multi-dimensional data container that acts as a basis for analysis and reporting processes for a business information enterprise system. FIG. 5 illustrates characteristics, key figures, and an information cube 500 according to some embodiments. A query may then be performed on the data in the cube 500 to generate a report for an end user.

Figure 6:
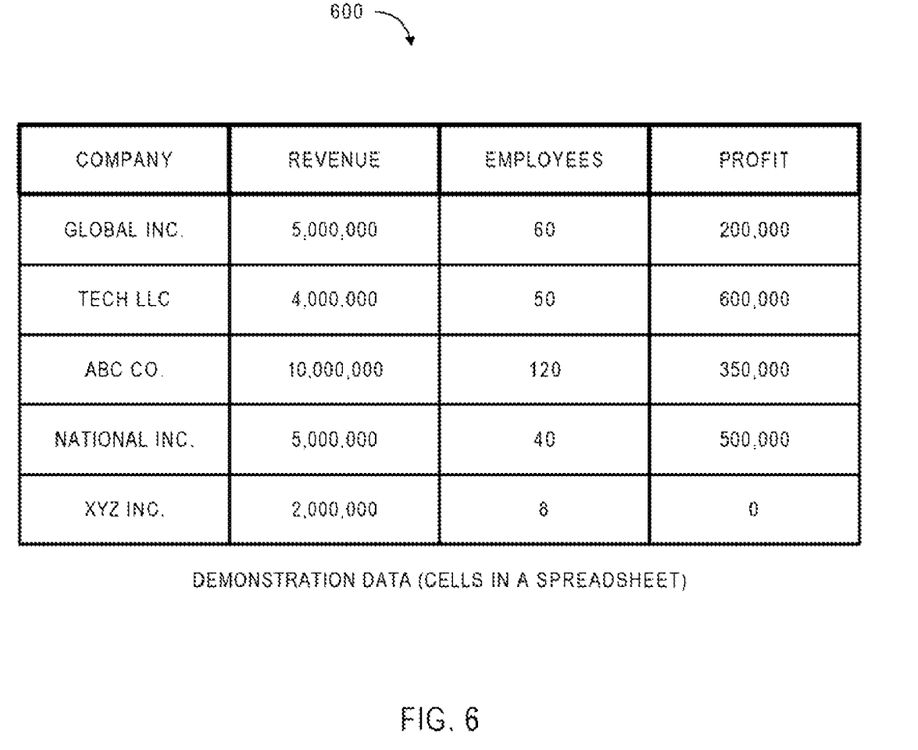
FIG. 6 illustrates an example of demonstration data according to some embodiments.

To facilitate an evaluation of a business information enterprise system, demonstration data may be entered via a front-end and be ultimately stored in an information cube at a back-end. According to some embodiments, a spreadsheet application executing at the front-end may be used to enter demonstration data. For example, FIG. illustrates demonstration data 600 according to some embodiments. In particular, the demonstration data 600 has been entered into the cells of a spreadsheet application.

The demonstration data 600 in the spreadsheet may then be interpreted to generate business data (which will ultimately be stored in an information cube). For example, spreadsheet column headers in the demonstration data (e.g., "company" and "revenue") may be interpreted as a caption or description for a characteristic or key figure.

According to some embodiments, the location of characteristic information in the spreadsheet has a pre-determined relationship to the location of key figure information. For example, characteristic information might always precede key figure information.

Figure 7:
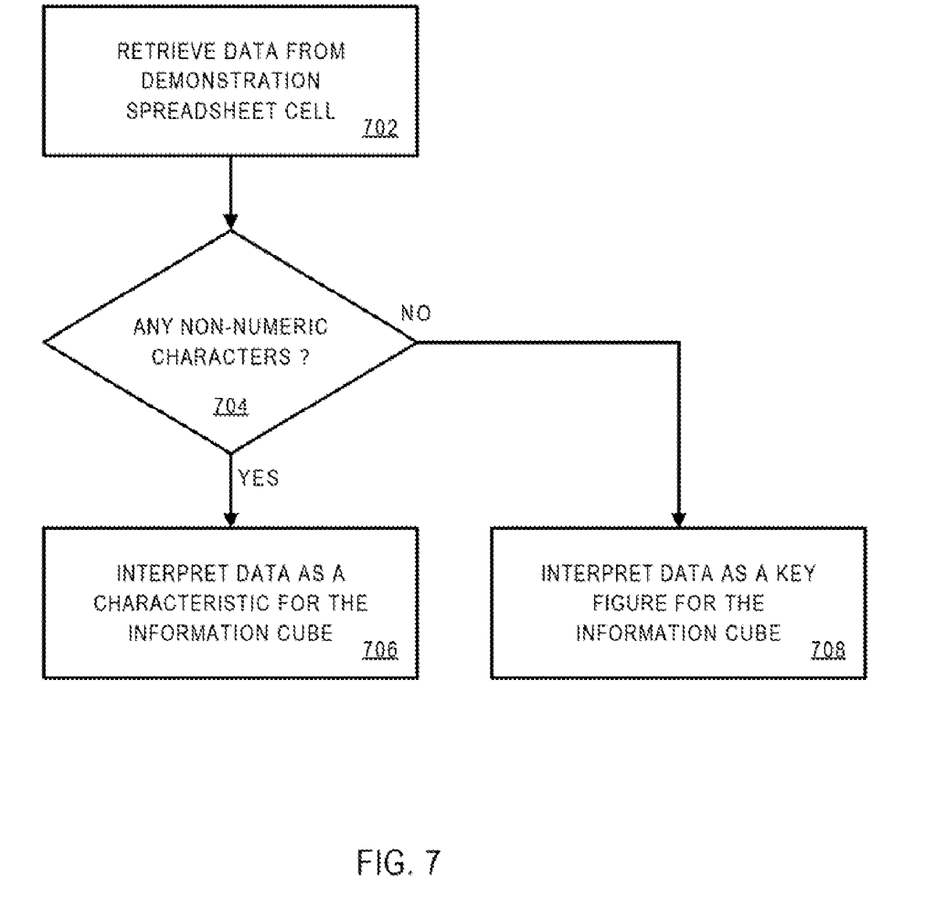
FIG. 7 is a flow diagram of process steps to interpret characteristics and key figures in demonstration data pursuant to some embodiments.

FIG. 7 is a flow diagram of process steps to interpret characteristics and key figures in demonstration data pursuant to some embodiments. The process might be performed, for example, by an application or service running at the back end of a business information enterprise system. At 702, data is retrieved from a cell of a spreadsheet that contains demonstration data.

According to some embodiments, a rule will determine whether the data in cell represents a characteristic or a key figure. For example, the rule might indicate that the data in the cell should be interpreted (i) as a characteristic when the cell includes a pre-determined symbol type or (ii) as a key figure when the cell does not include the pre-determined symbol type. In particular, if the retrieved data includes any non-numeric characters at 704, the data is interpreted as a characteristic for an information cube at 706. If the retrieved data does not includes any non-numeric characters at 704, the data is interpreted as a key figure for the information cube at 708.

In this way, demonstration data can be defined and interpreted in a relatively simple manner. In the case where a value that should be interpreted as a characteristic happens to not include any non-numeric characters (e.g., item number "12345"), the spreadsheet can be used to manually insert a non-numeric character (e.g., "#12345") so that the information will be interpreted correctly. According to other embodiments, only the first character in a cell is used to determine if the data is a characteristic or a key figure.

Figure 8:
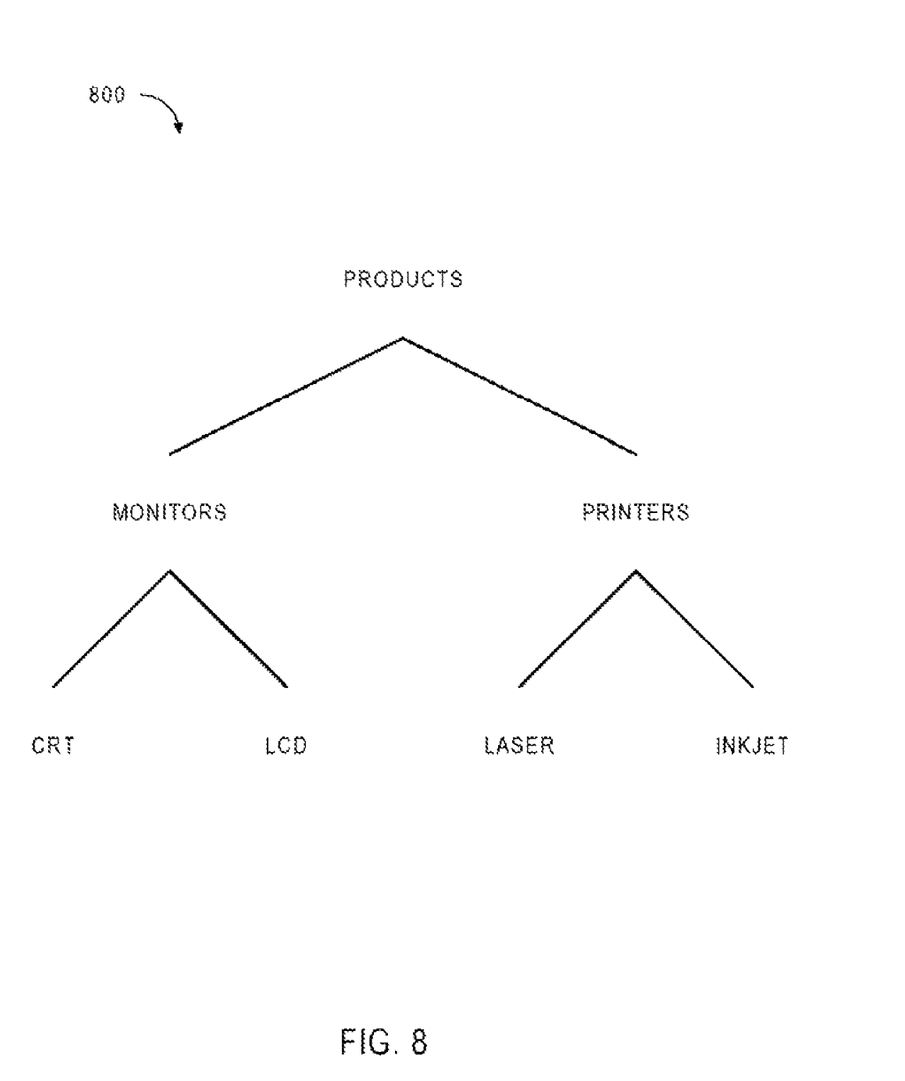

An information cube may also be associated with hierarchy information. By way of example, an attribute or hierarchy table may define a tree structure for information objects that can be useful when presenting information to an end user. FIG. 8 illustrates one example of hierarchy information 800 according to some embodiments. This case, there are two categories of products ("monitors" and "printers"), and each category is associated with two types products (e.g., the "printers" might be "laser" or "inkjet").

Figure 9:
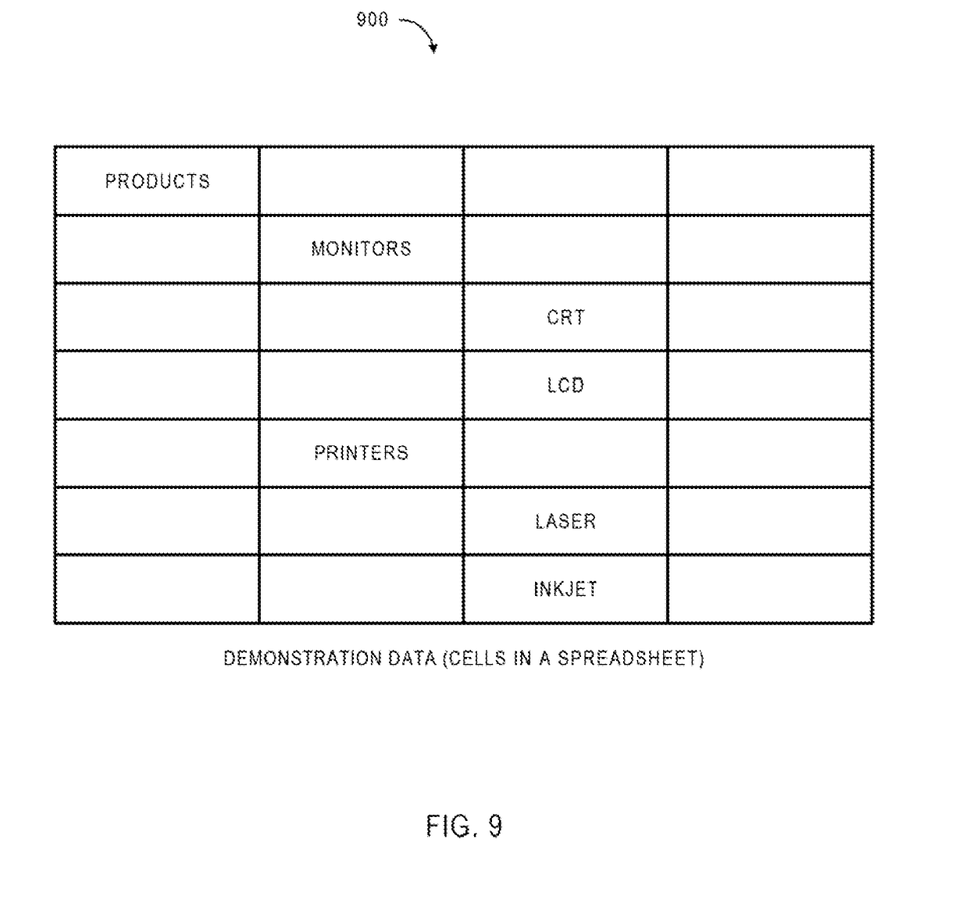
FIG. 9 illustrates an example of demonstration data according to some embodiments.

According to some embodiments, the demonstration data provided via the front end includes hierarchy information. For example, FIG. 9 illustrates demonstration data 900 that include hierarchy information according to this embodiment. In this case, the demonstration data 900 is associated with a spreadsheet application, and the hierarchy information is determined based on the location of information within the spreadsheet (e.g., which cell contains the information). In this example, each row in the spreadsheet contains a single item (e.g., a characteristic or key figure).

Figure 10:
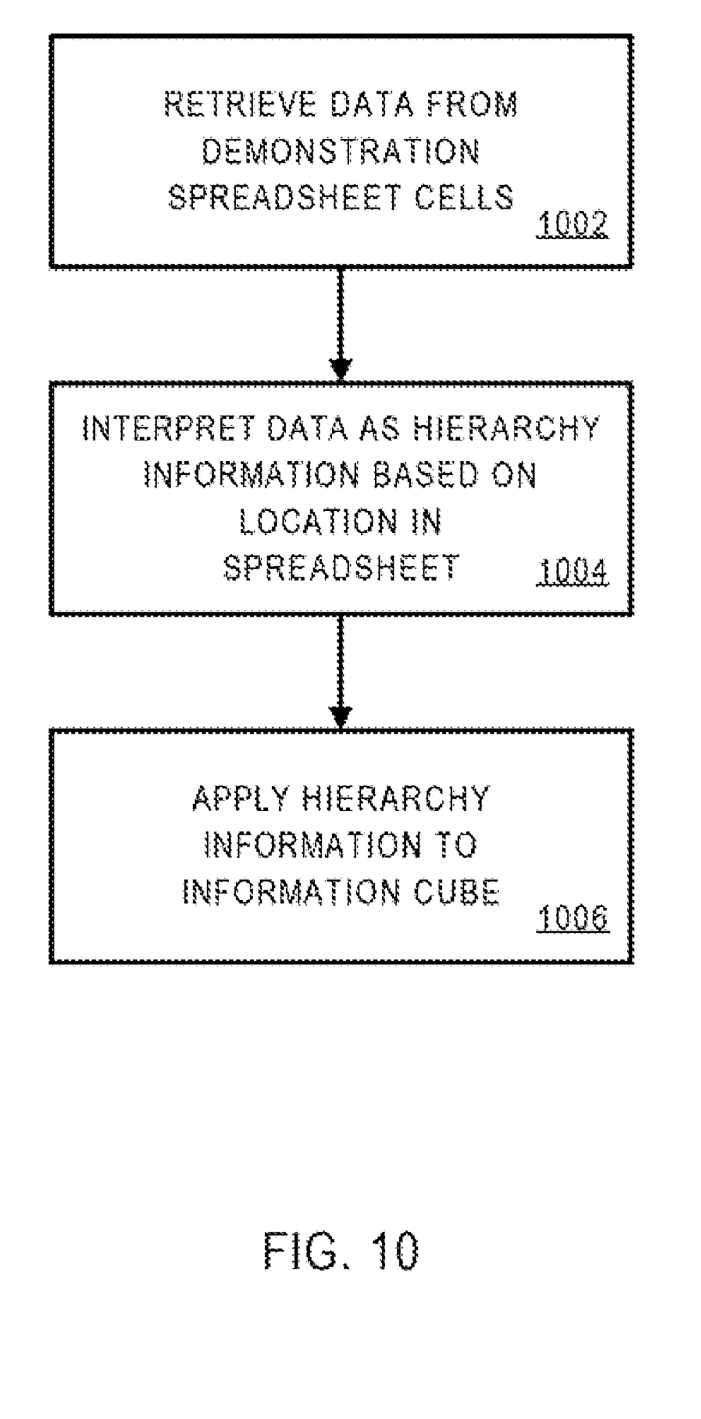
FIG. 10 is a flow diagram of process steps to interpret hierarchy information in demonstration data pursuant to some embodiments.

FIG. 10 is a flow diagram of process steps to interpret hierarchy information pursuant to some embodiments. The process might be performed, for example, by an application or service running at the back end of a business information enterprise system. At 1002, data is retrieved from the cells of a spreadsheet that contains demonstration data. At 1004, the data is interpreted as hierarchy information based on the location of information in the spreadsheet. For example, cells in a particular column may be interpreted as being subsets of cells in the immediately preceding column. The hierarchy information may then be applied, for example, to an information cube or be otherwise associated with business data at 1006.

Although demonstration data may be interpreted as business information (e.g., at the back-end of a business information enterprise system), it may be difficult to automatically create an information cube using that information. According to some embodiments, a "generic" information cube may be pre-defined. For example, the generic information cube may have five characteristics (e.g., having descriptions of "characteristic_1" through "characteristic_5") and five key figures (e.g., having descriptions of "key_figure_1" through "key_figure_5"). The business information extracted from the demonstration data may then be mapped to the generic information cube. Note that this may limit the amount of information that can be included in the demonstration data (e.g., only five characteristics and five key figures might permitted when demonstrating a business information enterprise system).

Figure 11:
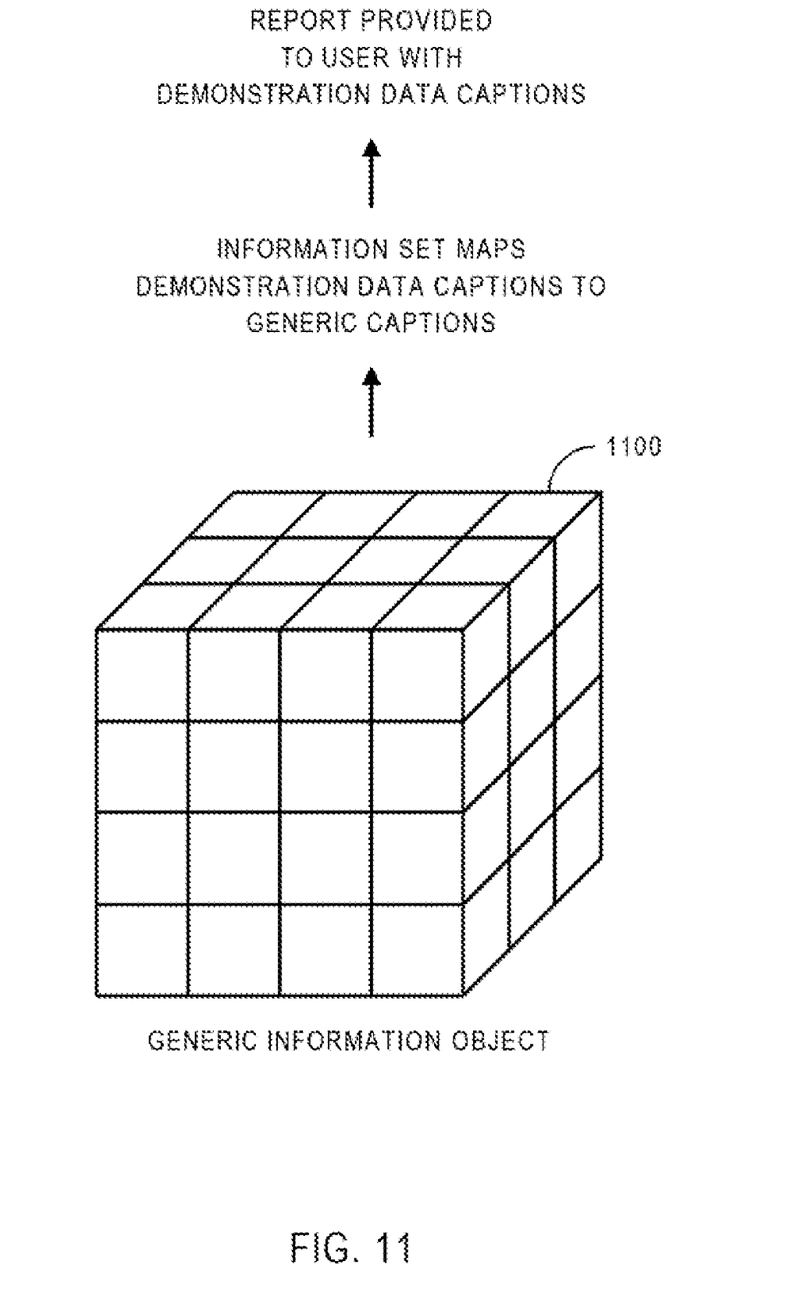
FIG. 11 illustrates how demonstration data may be mapped to a generic information object according to some embodiments.

For example, FIG. 11 illustrates how demonstration data may be mapped to a generic information object according to some embodiments. In particular, an information set may map demonstration data captions or descriptions (e.g., retrieved from spreadsheet cells) to the generic captions that are associated with a pre-defined generic information object (e.g., "company sales" might be mapped to "key_figure_3").

The information object might be associated with, for example, a generic transaction ODS object. Moreover, an information set may be generated on the transactional ODS object, and a query can be defined based on the information set. In this way, the generic information object may be used when analyzing and/or accessing data (using generic captions), but the presentation of data will use the appropriate demonstration data captions.

The embodiments described herein are solely for the purpose of illustration. Those skilled in the art will recognize other embodiments may be practiced with modifications and alterations limited only by the claims.

What is claimed is:

1. A system, comprising:
   a front-end apparatus to (i) receive demonstration data, (ii) transmit the demonstration data and (iii) transmit a query; and
   a back-end apparatus associated with a business information enterprise system and to (i) receive the demonstration data, and (ii) interpret the demonstration data in accordance with at least one rule to generate demonstration business data generically formatted in accordance with an architecture of the business information enterprise system, and (iii) receive the query, wherein the demonstration business data is associated with characteristics and key figures and includes at least one column of cells, and further wherein the at least one rule automatically determines (i) that a first cell is to be interpreted as a characteristic because the first cell includes a pre-determined symbol type and (ii) that a second cell is to be interpreted a key figure because the cell does not include the pre-determined symbol type;
   the front-end apparatus further to present at least a portion of the demonstration business data on a non-generic display in accordance with the query;
   wherein the demonstration data includes a table of cells that includes a plurality of rows and a plurality of columns;
   wherein the interpret the demonstration data in accordance with the at least one rule comprises:
      automatically determining hierarchy information associated with the demonstration data based on location of information within the table of cells that includes the plurality of rows and the plurality of columns; and
   wherein the automatically determining hierarchy information associated with the demonstration data based on location of information within the table of cells that includes the plurality of rows and the plurality of columns comprises:
      determining hierarchy information associated with the demonstration data based on location of information within the table of cells by interpreting a first two cells in one column of the plurality of columns as being subsets of a first cell in a column that immediately precedes the one column of the plurality of columns; and
      determining hierarchy information associated with the demonstration data based on location of information within the table of cells by interpreting a second two cells in the one column of the plurality of columns as being subsets of a second cell in the column that immediately precedes the one column of the plurality of columns.

2. The system of claim 1,
   wherein the front-end apparatus includes a front-end application that presents the portion of the demonstration business data to a user and is associated with at least one of: (i) a spreadsheet application, (ii) a Web authoring tool, (iii) a portal, (iv) a mobile device, (v) a Web browser, or (vi) a third-party application.

3. The system of claim 1, wherein the back-end apparatus includes a back-end application that includes at least one of: (i) a presentation service, (ii) an analysis and access service, (iii) a storage service, or (iv) a meta-data service.

4. The system of claim 1, wherein the business data is associated with characteristics and key figures.

5. The system of claim 1, wherein at least one column of cells is associated with a column header, and the column header is interpreted in connection with at least one of: (i) an information object, (ii) a caption, or (iii) a dimension.

6. The system of claim 5, wherein columns are arranged such that the location of characteristic information has a pre-determined relationship to the location of key figure information.

7. The system of claim 6, wherein columns are arranged such that characteristic information precedes key figure information.

8. The system of claim 1, wherein the rule determines whether a cell is interpreted as a characteristic or a key figure.

9. The system of claim 8, wherein a cell is interpreted (i) as a characteristic when the cell includes a pre-determined symbol type or (ii) as a key figure when the cell does not include the pre-determined symbol type.

10. The system of claim 1, wherein said front-end apparatus receives the demonstration data and presents the portion of the demonstration business data in substantially real time without using a staging engine, and wherein said back-end apparatus interprets the demonstration data and receives the query in substantially real time without using a staging engine.

11. The system of claim 1, wherein the demonstration business data is associated with a transactional operational data source object.

12. The system of claim 11, wherein the transactional operational data source object is generic and information associated with the demonstration business data is mapped to the generic transactional operational data source object.

13. The system of claim 11, wherein said back-end apparatus is further to generate an information set on the transactional operational data source object, wherein the query is defined based on the information set.

14. The system of 1, wherein the front-end apparatus is remote from the back-end apparatus, and the transmitting and receiving are performed via a communication network.

15. The system of claim 14, wherein the back-end apparatus includes a staging engine, and the receiving, interpreting, and transmitting are performed without using the staging engine.

16. The system of claim 1, wherein each of the plurality of rows contains only one cell that contains an item.

17. The system of claim 1, wherein each of the plurality of rows contains only one cell that is interpreted as a characteristic or key figure.

18. The system of claim 1, wherein the front-end apparatus includes a processor to receive the demonstration data; and
   wherein the back-end apparatus includes a processor to (i) receive the demonstration data, and (ii) interpret the demonstration data in accordance with at least one rule to generate the demonstration business data.

19. A system, comprising:
   a back-end apparatus, associated with a business information enterprise system, to (i) receive demonstration data, associated with a plurality of cells, from a front-end apparatus associated with the business information enterprise system, and (ii) interpret the demonstration data in accordance with at least one rule to generate demonstration business data, the demonstration business data including characteristics, key figures, and hierarchy information, and (iii) receive a query, wherein the query is defined based on the information set,
   wherein said interpret includes:

automatically interpret a first cell of the demonstration data as a characteristic because the first cell includes non-numeric characters;

automatically interpret a second cell of the demonstration data as a key figure because the second cell does not include non-numeric characters;

and wherein the demonstration business data is associated with a transactional operational data source object, the transactional operational data source object being generic;

the back-end apparatus further to:

map information associated with the demonstration business data to the generic transactional operational data source object;

generate an information set on the generic transactional operational data source object; and a front-end apparatus to present at least a portion of the demonstration business data in accordance with the query, wherein the demonstration business data is presented on a non-generic display based on said mapping, said characteristics, and said key figures;

wherein the demonstration data includes a table of cells;

wherein the interpret the demonstration data in accordance with the at least one rule comprises automatically determine hierarchy information associated with the demonstration data based on location of information within the table of cells that includes the plurality of rows and the plurality of columns; and wherein the automatically determine hierarchy information associated with the demonstration data based on location of information within the table of cells that includes the plurality of rows and the plurality of columns comprises:

determine hierarchy information associated with the demonstration data based on location of information within the table of cells by interpreting a first two cells in one column of the plurality of columns as being subsets of a first cell in a column that immediately precedes the one column of the plurality of columns; and determine hierarchy information associated with the demonstration data based on location of information within the table of cells by interpreting a second two cells in the one column of the plurality of columns as being subsets of a second cell in the column that immediately precedes the one column of the plurality of columns.

20. The system of claim 19, wherein each of the plurality of rows contains only one cell that contains an item.

21. The system of claim 19, wherein each of the plurality of rows contains only one cell that is interpreted as a characteristic or key figure.

22. The system of claim 19, wherein the front-end apparatus includes a processor to receive the demonstration data; and wherein the back-end apparatus includes a processor to (i) receive the demonstration data, and (ii) interpret the demonstration data in accordance with at least one rule to generate the demonstration business data.

\* \* \* \* \*